United States Patent [19]

Kliman et al.

[11] Patent Number: 4,859,974
[45] Date of Patent: Aug. 22, 1989

[54] ELECTROMAGNETIC MOTOR/ACTUATOR

[75] Inventors: Gerald B. Kliman, Schenectady; Donald W. Jones, Burnt Hills, both of N.Y.

[73] Assignee: General Electric Company, Schenectady, N.Y.

[21] Appl. No.: 255,216

[22] Filed: Oct. 11, 1988

[51] Int. Cl.⁴ .............................................. H01F 7/08
[52] U.S. Cl. ...................................... 335/229; 310/12; 310/14
[58] Field of Search ............... 335/229, 230, 232, 279; 310/12, 14

[56] References Cited

U.S. PATENT DOCUMENTS 3,891,874  6/1975  Roters .................................... 310/14
4,037,122  7/1977  Bonner et al. ......................... 310/14
4,220,899  9/1980  Heide ............................... 310/14 X

OTHER PUBLICATIONS

E. R. Laithwaite; Induction Machines for Special Purposes; 1966; pp. 154–157, Chemical Publishing Co., Inc., New York.

D. Matt et al., "Longitudinal Linear Reluctance Actuator", *Electric Machines and Power Systems,* 13, pp. 299–313, 1987.

*Primary Examiner*—George Harris
*Attorney, Agent, or Firm*—Marvin Snyder; James C. Davis, Jr.

[57] ABSTRACT

An electromagnetic actuator includes a moving element comprising a plurality of permanent magnets oriented in alternating magnetic pole position so as to present a sequence of alternating north-south magnetic poles. The magnets can be angularly oriented within a magnetic structure serving to concentrate magnetic flux and focus such flux at the surface of the structure. Alternatively, the magnets are surface mounted within a structure of non-magnetic material. The actuator includes opposed electro-magnetic stators between which the moving element is positioned.

13 Claims, 9 Drawing Sheets

ELECTROMAGNETIC MOTOR/ACTUATOR

BACKGROUND OF THE INVENTION

This invention relates in general to dynamoelectric or electromagnetic machines and, more particularly, to electromagnetic actuators.

Electromagnetic actuators have a wide variety of applications ranging from the movement of aircarft control surfaces to the movement of active suspensions in passenger vehicles, as well as many other applications. In general these motor-actuator devices include a moving element or ram which moves with respect to a fixed element referred to as a stator. Electromagnetic actuators are often employed to eliminate hydraulics and gears, thus achieving reductions in both weight and volume in a particular application. Other desirable features of electromagnetic actuators are relatively high efficiency, wide bandwidth and "power by wire", or ability to operate on electrically-supplied power.

Linear induction machines have been known for a number of years and have been used to deliver force in automation and transportation applications. Although linear induction machines represent an important development, known types of machines unfortunately are generally undesirable when used as electromagnetic actuators due to their low efficiency and power factor as well as high moving element losses. Other machines, such as wound field linear synchronous inductor machines, have been employed in transportation applications and some low power actuator applications. However, linear synchronous inductor machines suffer from low force densities due to the inductor principles required for brushless operation.

Linear reluctance machines also have been known for some time and have found application as low power actuators. Unfortunately, linear reluctance actuators have relatively low efficiency and low force density. Also, linear reluctance actuators tend to suffer from force pulsations and undesirable noise. In certain applications, such as in automobile suspensions for example, such pulsations and noise can be critical factors.

Permanent magnet linear actuators are commonly used in computer disk drives for moving the head which reads the disk media. Such permanent magnet linear actuators, however, have a relatively short stroke and thus are unsuitable for applications which require a relatively long stroke such as in active automotive suspensions.

BRIEF SUMMARY OF THE INVENTION

One object of the invention is to provide an electromagnetic actuator apparatus having relatively high force density.

Another object is to provide an electromagnetic actuator apparatus which efficiently utilizes space in terms of the volume occupied.

Yet another object of the invention is to provide an electromagnetic actuator apparatus which is manufacturable at relatively low cost.

In accordance with one embodiment of the present invention, an electromagnetic actuator apparatus is provided which includes a moving element of magnetically permeable material having a surface with a lengthwise dimension. The apparatus further includes a stator situated adjacent the surface of the moving element and forming an air gap between the stator and the moving element. A plurality of magnets are situated within the moving element along the lengthwise dimension. The magnets are oriented at an angle with respect to the surface, the angle being selected so as to focus the magnetic flux of the magnets on the airgap. Each of the magnets is oriented to exhibit a polarity toward the airgap opposite the polarity of an adjacent magnet.

In accordance with another embodiment of the present invention, an elecromagnetic actuator is provided which includes a moving element having a lengthwise dimension along which a plurality of cavities are situated at spaced intervals. These cavities are internal to the moving element and are angularly oriented with respect to the lengthwise dimension of the moving element. Each cavity includes a top and a bottom. The actuator further includes a stator which is situated adjacent the moving element along the lengthwise dimension thereof. The stator is positioned adjacent the tops of the cavities such that an airgap is formed between the moving element and the stator. Each of the cavities has a magnet situated therein. The cavities are configured to hold the magnets at an angle with respect to the lengthwise dimension, such angle being selected so as to focus magnetic flux on the airgap. Each magnet exhibits a north and south pole. The magnets are oriented in the respective cavities such that, proceeding along the lengthwise dimension of the moving element, the poles of the magnets at the tops of the cavities alternate polarity in north, south, north, south fashion.

In still another embodiment, the moving element is supported on rails between first and second opposed stators. First and second airgaps are defined between corresponding surfaces of the moving element and a surface of an adjacent one of the stators. The magnets in the moving element focus magnetic flux toward each of the stators so that the force reacting on the moving element is increased by use of the two stators.

In addition to the angle-oriented magnet arrangement, there is also disclosed a surface mount arrangement in which the magnets are oriented at zero degrees. This surfacemount arrangement may include a stamped or punched support plate of a non-magnetic material in the shape of a ladder in which the rung spacing is selected to receive a magnet of preselected size. The rungs may comprise punchings such that each rung has two upstanding flanges. The rung spacing is selected to be slightly narrower than the magnet width and the flanges are bent at an angle to hold the magnets in place. Alternatively, the rung spacing may be wider than the magnets and glass cloth or suitable material is woven under the rungs and over the magnets to hold them in place. The assembly can then be bonded together using epoxy resin. In either of these embodiments, the moving element with magnets is constructed of two opposed mirror-image plates. The two plates may be joined together using side plates with rails. Alternatively, the plates are stamped with deformed, outwardly extending flanges of an opposed plate. The flanges may be spot welded together to join the two plates and to form integral rails for the moving element.

In yet another embodiment, the magnets may be surface mounted on plates of non-magnetic material on which U-shaped channels are fastened. Each magnet is sized to fit between successive U-shaped channels and is sandwiched between opposed plates. Alternatively, the plates may be stamped or punched to create upstanding tabs corresponding to the U-shaped channels. In either instance, the side rails may be separate elements attached to the opposed plates or may be integral parts of the plates formed by deforming the plate edges into flanges oriented to mate with flanges of an opposed plate.

The features of the invention believed to be novel are specifically set forth in the appended claims. However, the invention itself, both as to its structure and method of operation, may best be understood by referring to the following description in conjunction with the accompanying drawings.

BRIEF DESCRIPTION OF THE DRAWINGS

FIG. 8 is a cross-sectional view of the motor-actuator of the present invention.

DETAILED DESCRIPTION OF THE INVENTION

Figure 1:
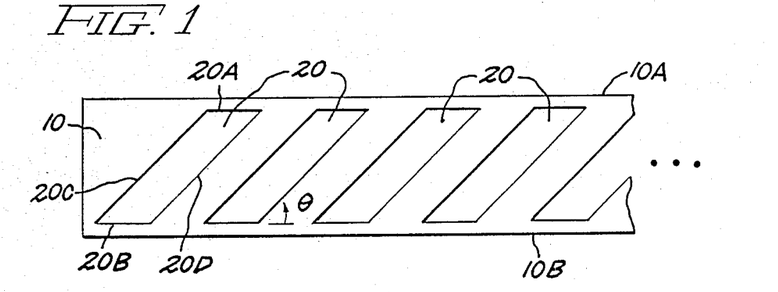
FIG. 1 is a side elevational view of a portion of one lamination of the moving element of the present invention.

An electromagnetic actuator according to the present invention includes both a stationary element (or stator), and a moving element (or ram) which moves with respect to the stationary stator. FIG. 1 is a side elevational view of a portion of one lamination 10 having upper and lower edges 10A and 10B, and which is employed in the moving element of the motor-actuator of the invention. Lamination 10 is fabricated from magnetically permeable material such as iron, steel and the like, for example. Lamination 10 includes a plurality of cut-out portions 20, each in the shape of a parallelogram defined as follows. Cut-out portions 20 include upper and lower edges 20A and 20B, respectively, and further includes side edges 20C and 20D. Cut-out portions 20 are angularly oriented at a angle $\theta$ with respect to the horizontal or lengthwise dimension of lamination 10. In this particular example of the invention, $\theta$ is selected to be approximately 45 degrees. It will be appreciated, however, that angle $\theta$ may be greater or less than this value, depending upon the particular application. A reciprocating punch press may be used to produce cut-out portions 20 in lamination 10. Alternatively, a rotating (rule) die or other methods may be used to fabricate cut-out portions 20 in lamination 10.

Figure 2:
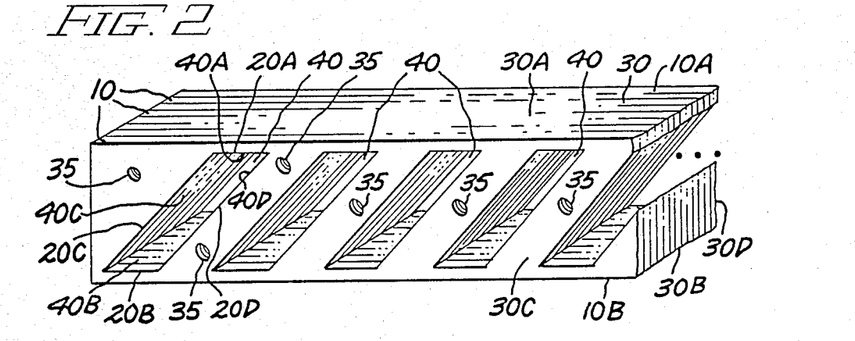
FIG. 2 is a side perspective view of a plurality of laminations of the type shown in FIG. 1 assembled into a portion of a moving element employed in the present invention.

A plurality of laminations 10 are stacked side by side in sandwich-like fashion to build up and form a lamination stack 30 of the moving element, a portion of such stack 30 being shown in FIG. 2. To hold lamination stack 30 together, rivets are passed through rivet holes 35 in laminations 10. When laminations 10 are thus stacked, cut-out portions 20 of each laminations 10 align with corresponding cut-out portions 20 of the other laminations 10 to form magnet receiving cavities 40 with the same angular orientation as cut-out portions 20. Each cavity 40 includes an upper surface 40A formed by the alignment of cut-out portion upper edges 20A. Likewise, each cavity includes a lower surface 40B formed by the alignment of cut-out portion lower edges 20B. In a similar manner, each cavity 40 includes a side surface 40C formed by the alignment of cut-out portion side edges 20C and further includes a side surface 40D formed by the alignment of cut-out portion side edges 20D. Although each of cavities 40 includes surfaces 40A–40D, for simplicity of illustration only the leftmost cavigy in FIG. 2 is illustrated with surfaces 40A–40D labeled as such. The stacking of laminations 10 also causes upper stack surface 30A and lower stack surface 30B to be formed. Stack 30 further includes front and back surfaces 30C and 30D. In one embodiment of the invention, laminations 10 of stack 30 are bonded together by epoxy adhesive, varnish or similar materials therebetween.

Figure 3:
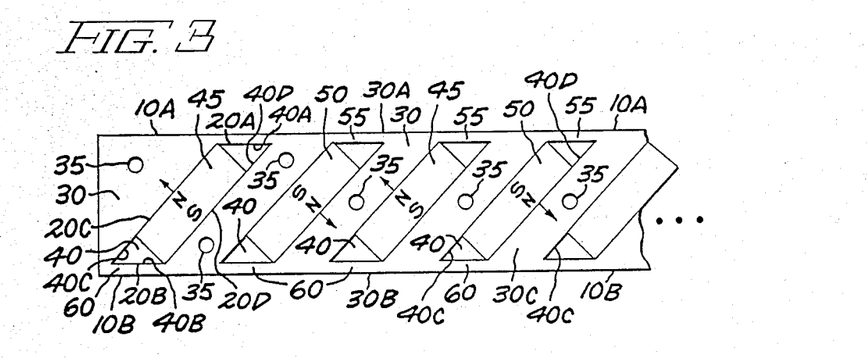
FIG. 3 is a side elevational view of the portion of the moving element of FIG. 2 showing magnets disposed in the cavities of the moving element.

A side elevational view of a portion of lamination stack 30 is shown in FIG. 3 with each of magnets 45 and 50 snugly situated in a separate one, respectively, of cavities 40. Magnets 45 are those magnets which, when positioned in cavities 40, have their north poles facing generally upward toward upper stack surface 30A. Magnets 50 are defined to be those magnets which, when positioned in cavities 40, have their north poles facing generally downward toward lower stack surface 30B. Actually, the north poles of magnets 45 face the side surface 40C of cavity 40 to enable the flux from the north poles thereof to be directed toward both upper and lower stack surface 30A and 30B through laminations 10. Similarly, the south poles of magnets 50 face side surface 40D of cavity 40 which enables the flux from the south poles to be directed toward both upper and lower stack surfaces 30A and 30B. Magnets 45 and 50 are held in place in cavities 40 by a wedge fit, an adhesive, or other suitable means.

Magnets 45 are situated in every other cavity 40 as the viewer of FIG. 3 proceeds from left to right. Magnets 50 are interspersed among magnets 45 so as to be situated in every other cavity 40 as the viewer of FIG. 3 proceeds from left to right. That is, proceeding from left to right, cavities 40 are populated with a magnet 45 (north pole up), a magnet 50 (south pole up), a magnet 45 (north pole up), a magnet 50 (south pole up) and so forth. In FIG. 3, the designations N and S are used to indicate the north and south poles, respectively, of magnets 45 and 50.

Lamination stack 30 includes a plurality of upper and lower bridges 55 and 60 adjacent the upper and lower surfaces 40A and 40B of each of cavities 40 as seen in FIG. 3. Bridges 55 and 60 lend structural integrity to stack 30 while stack 30 is being fabricated.

Figure 4:
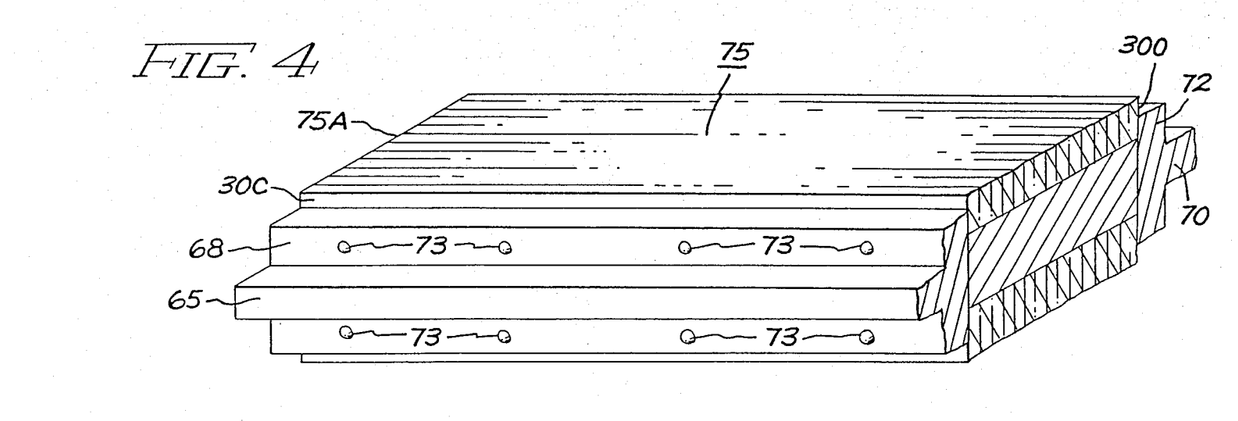
FIG. 4 is a side perspective view of the moving element of FIG. 3 after side rails have been mounted thereon.
Figure 5:
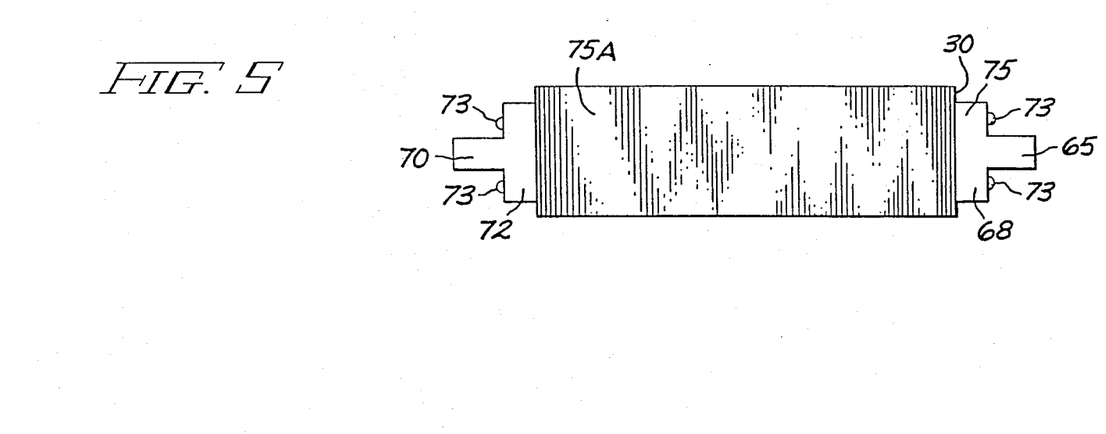
FIG. 5 is an end elevational view of the moving element of FIG. 4.

A portion of the completed moving element 75 is shown in side perspective in FIG. 4. As seen in FIG. 4, side rails 65 and 70 are mounted via mounting plates 68 and 72 to front and back stack surfaces 30C and 30D, respectively, thus substantially completing the moving element of the electromagnetic actuator which is now designated moving element 75. Rails 65 and 70 may each be integral with their respective side plates 68 and 72. Moving element 75 may be referred to as a ram or rotor in that it is the moving component of the actuator as compared to the stationary stator described later in detail. Moving element 75 includes an end 75A. An end view of moving element 75 from the viewpoint of end 75A is shown in FIG. 5. The geometry of moving elements 75 is such that, when mated with an appropriate stator, moving element 75 would move in or out of the page from the perspective of the veiwer of FIG. 5. Side rails 65 and 70 support moving element 75 with respect to the stator, as will be described in more detail subsequently.

Figure 6:
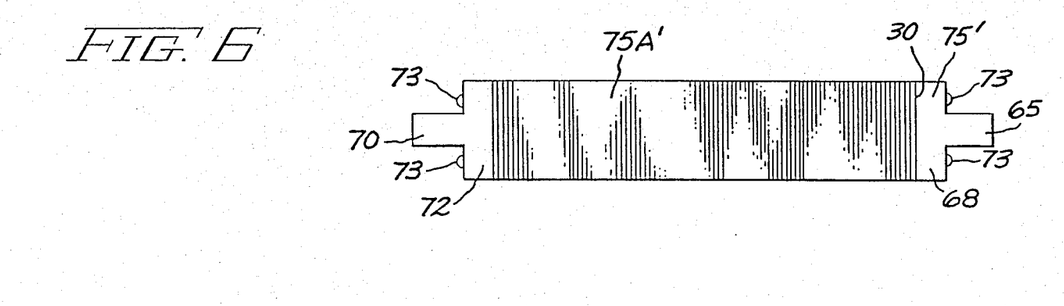
FIG. 6 is an end elevational view of the moving element of FIG. 5 after the bridges have been removed from the upper and lower surface thereof.

Once stack 30 has been mounted to side rails 65 and 70, upper stack surface 30A and lower stack surfaces 30B may be machined away, or otherwise processed, to remove upper bridges 55 and lower bridges 60, respectively, shown in FIG. 3, resulting in the embodiment of FIG. 6. In this embodiment, rigidity of the lamination stack is provided by mounting plates 68 and 72, which now serve to maintain the integrity of the moving element as well as to support side rails 65 and 70. Side plates 68 and 72 are fixed to lamination stack 30 by means of rivets 73 extending through the entire stack in rivet holes 35 (shown in FIGS. 2 and 3). Rivets 73 provide lateral stability to the moving element which, in FIG. 6 and subsequent figures, is referred to as moving element 75'. Although bridges 55 and 60, shown in FIG. 3, may undesirably draw flux away from magnets 45 and 50, it is not absolutely essential to remove bridges 55 and 60. For exemplary purposes, however, the subsequent discussion will assume use of the bridgeless moving element 75' of FIG. 6 to illustrate the invention. In FIG. 6, the end of moving element 75' facing the viewer is now referred to as end 75A'.

Figure 7:
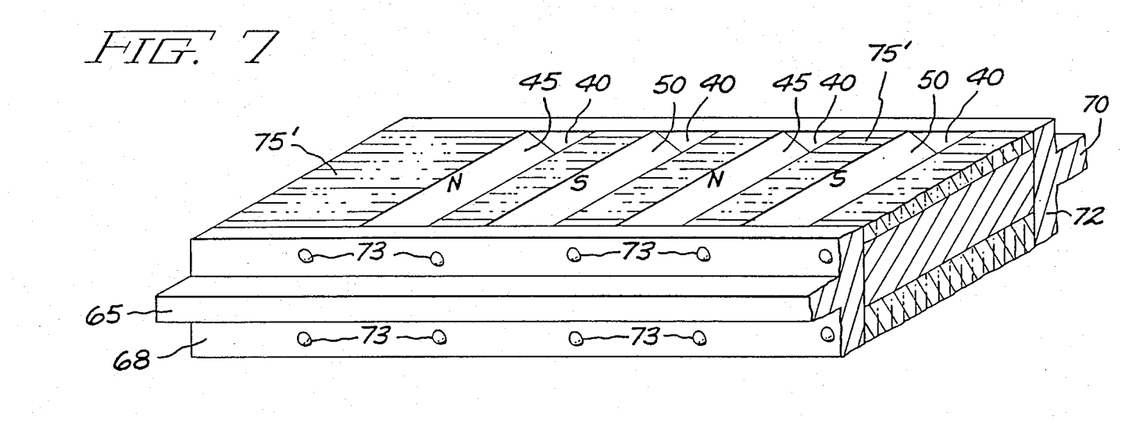
FIG. 7 is a side perspective view of a portion of the moving element of FIG. 6.

Moving element 75' is more fully seen in the side perspective view of FIG. 7, which is viewed from slightly above element 75'. When upper bridges 55 are removed in the aforementioned machining operation, cavities 40 and magnets 45 and 50 become exposed in the view of FIG. 7. The alternating north, south, north, south (N,S,N,S) polarity of magnets 45 and 50 is readily observed from left to right, starting at end 75A'.

Figure 8A:
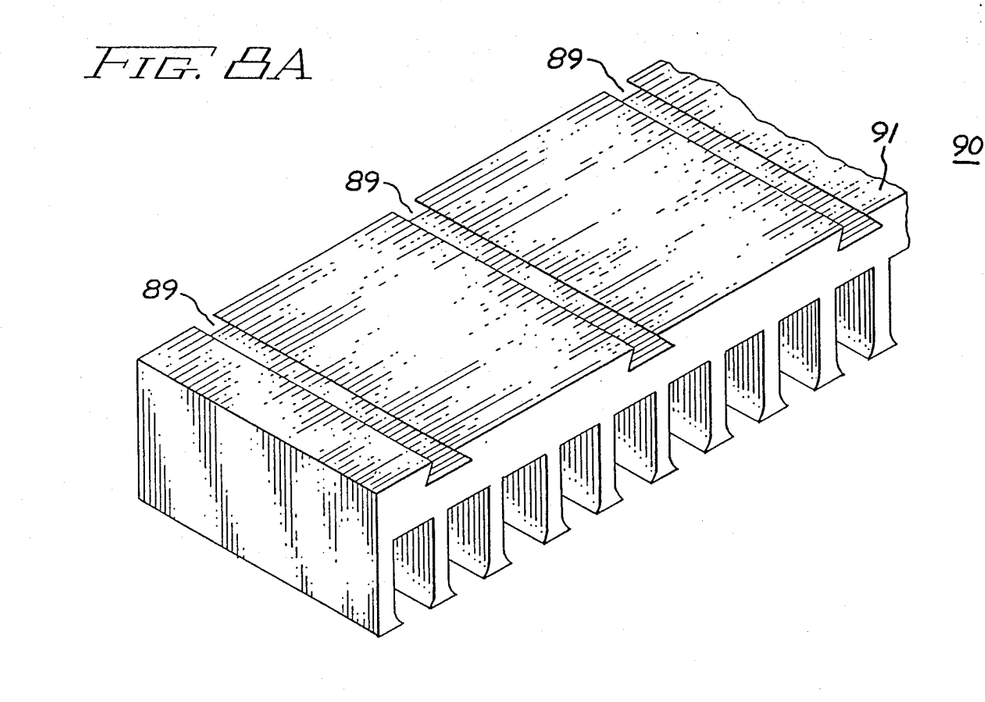
FIG. 8A is a partial cross-sectional view of a portion of a stator in the actuator shown in FIG. 8, illustrating the stator laminations and preformed dovetails.

Moving element 75' is shown situated in position in electromagnetic actuator 80 in FIG. 8. More specifically, FIG. 8 shows an end cross-sectional view of actuator 80 in which moving element 75' is oriented so as to move in or out of the page when activated. Actuator 80 includes a housing 85 having a generally rectangular cross section and including opposed sides 85A and 85B, and further including opposed upper and lower sections 85C and 85D. An upper stator 90 is mounted to upper housing section 85C and a lower stator 95 is mounted to lower housing section 85D as shown. Upper stator 90 and lower stator 95 include stator windings 100 and 105, respectively, which are partially shown in FIG. 8. The stators may be attached to housing 85 using dovetails 87. FIG. 8A illustrates a partial cross section of a portion of a stator 90 showing the laminations 91 of the stator and the preformed dovetails 89 which mate with dovetails 87 shown in FIG. 8.

Stators 90 and 95 respectively include surfaces 90A and 95A between which moving element 75' is suspended. That is, support members 110 and 115 are respectively situated on, and attached to, housing sides 85A and 85B. Support members 110 and 115 respectively include substantially U-shaped channels 120 and 125 for slidably mating with rails 70 and 65, respectively, of moving element 75'. As seen in FIG. 8, rails 65 and 70 are respectively situated in channels 125 and 120 such that moving element 75' moves toward the viewer or away from the viewer when actuator 80 is energized. Support members 110 and 115 are positioned with respect to stators 90 and 95 such that an upper gap of distance g1 is formed between surface 90A of stator 90 and moving elements 75', and such that a lower gap of distance g2 is formed between surface 95A of stator 95 and moving element 75'.

Figure 9:
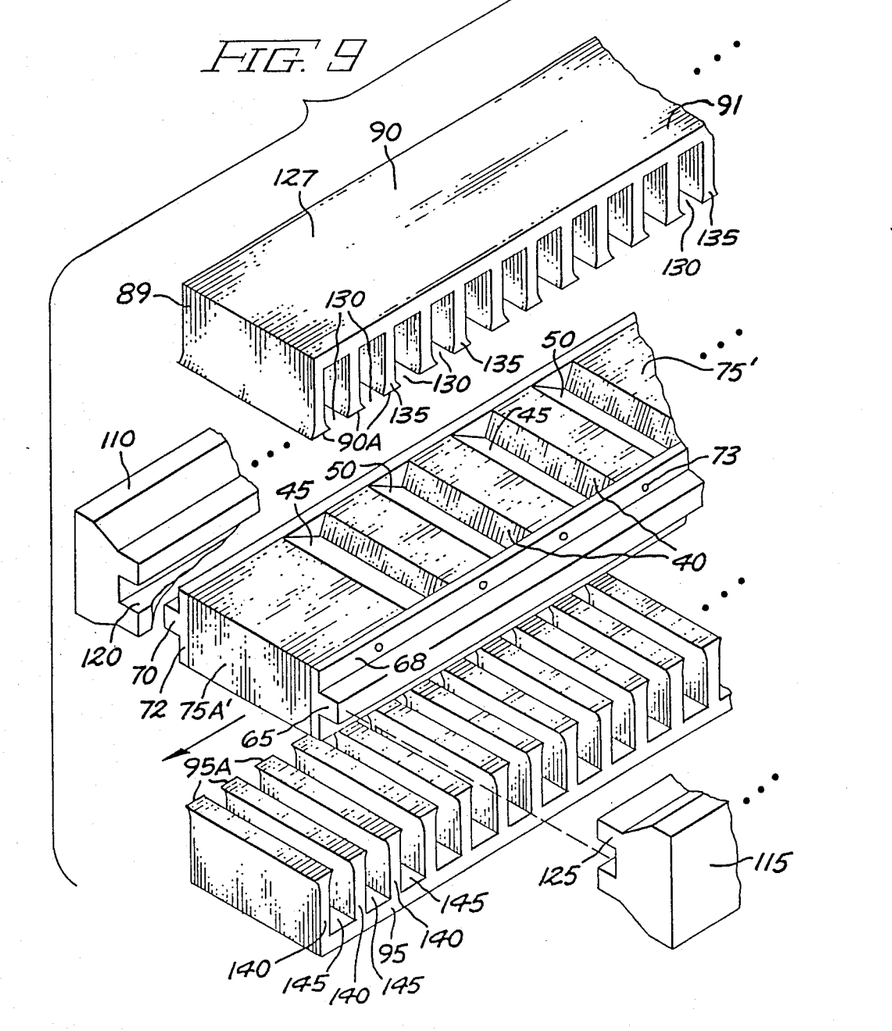
FIG. 9 is an exploded perspective view of the motor-actuator of FIG. 8.

An exploded perspective view of electromagnetic actuator 80 of FIG. 8, but without housing 85 present, is shown in FIG. 9. Although an end view of upper stator 90 and lower stator 95 is shown in FIG. 8, the stator structures are more completely shown in the exploded side perspective view of FIG. 9. In an alternative embodiment of the invention, either upper stator 90 or lower stator 95 may be eliminated. Of course, in an embodiment wherein only one of stators 90 and 95 is present, the force with which moving element 75' travels will be reduced.

Upper stator 90 comprises a relatively conventional stator which includes a core 127 in the form of a stack of laminations 91 of magnetically permeable material. Stator core 127 exhibits a lateral dimension along which a plurality of stator slots 130 are situated. A plurality of stator teeth 135 are situated between stator slots 130. A stator winding (not shown in FIG. 9 for simplicity of illustration) is wound through slots 130 and around groups of teeth 135 in conventional manner. A portion of the stator winding appears in FIG. 8 as upper stator winding 100. Upper stator 90 may be fabricated by building up a plurality of stator laminations 91, as shown in FIG. 9, in conventional manner. The end of each of stator teeth 135 facing moving elements 75' is designated a tooth tip or surface 90A from which airgap distance g1, shown in FIG. 8, is measured.

Lower stator 95 is substantially identical to upper stator 90 and includes stator teeth 140 and stator slots 145 which are similar to stator teeth 135 and stator slots 130, respectively, of upper stator 90. Each of stator teeth 140 includes a stator tooth tip or surface 95A at the end thereof which is similar to surface 90A of upper stator 90. Stator surfaces 95A are the surfaces from which airgap distance g2 is measured, as indicated in FIG. 8.

Since cavities 40 are oriented at an angle $\theta$ with respect to the horizontal or lengthwise dimension of moving element 75', as described in conjunction with FIGS. 1 and 2, magnets 45 and 50, visible in FIG. 9, are likewise oriented at an angle of $\theta$ with respect to the lengthwise dimension of moving element 75'. Orienting magnets 45 and 50 in this manner focuses flux from each of magnets 45 and 50 on the adjacent airgaps g1 and g2, shown in FIG. 8, to achieve higher flux density in these airgaps than would otherwise be obtained. Although an angle θ of approximately 45 degrees has been used for purposes of example, as indicated in conjunction with FIG. 1, it has been found that orienting magnets 45 and 50 at an angle within the range of approximately 35 degrees to 90 degrees with respect to the horizontal dimension of moving element 75' desirably focuses flux on airgaps g1 and g2 of FIG. 8.

Figure 10A:
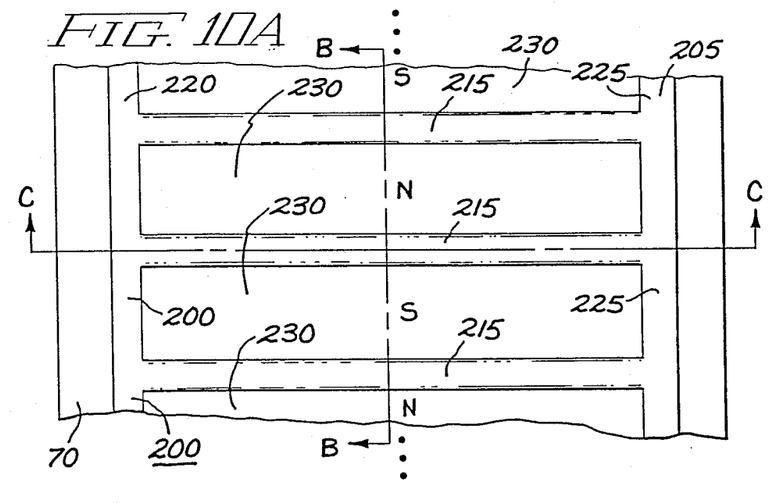
FIGS. 10A–10D show portions of an alternative moving element in which magnets are surface-mounted.
Figure 10B:
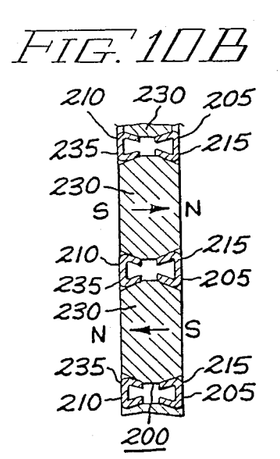
Figures 10C, 10D:
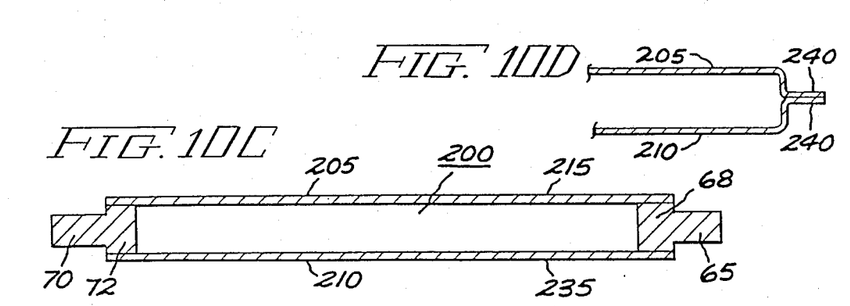

FIG. 10A-10C illustrate another embodiment of the invention in which the magnets on moving element 200 are surface mounted; that is, the angle θ, defined previously, is equal to zero. For simplicity of illustration, only a portion of moving element 200 is shown in FIG. 10A. However, the pattern shown in FIG. 10A for moving element 200 is repeatedly continued to fabricate a moving element of desired length. An alternative electromagnetic actuator or motor is readily fabricated by substituting moving element 200 for moving element 75' of the actuator of FIGS. 8 and 9.

Moving element 200 includes an upper ladder structure 205 which is visible in the top view of the moving element shown in FIG. 10A. Upper ladder structure 205 includes a plurality of rungs 215 each having opposed ends which are attached to substantially parallel rung support members 220 and 222 that extend along the lateral dimension of moving element 200. Moving element 200 includes a plurality of magnets 230, one magnet of which is situated between each pair of adjacent rungs 215. Magnets 230 are oriented between adjacent rungs 215 such that, for every other magnet 230, the north pole faces upward. That is, proceeding along the lateral dimension of moving element 200, the polarity of magnets 230 alternate south, north, south, north and so forth, as indicated. Ladder structure 205 may be stamped or punched from non-magnetic material, aluminum or austenitic steel, for example, so that rungs 215 and side members 220 and 225 are an integral unit.

Moving element 200 further indicates a lower ladder structure 210, a portion of which may be seen in FIG. 10B which is a cross-sectional view of moving element 200 of FIG. 10A taken along section line B—B. Lower ladder structure 210 is substantially identical to, and aligned with, upper structure 205, as will be appreciated when considering FIG. 10A in conjunction with FIG. 10B. Rungs 215 of upper ladder structure 205 and rungs 235 of lower ladder structure 210 are visible in FIG. 10B. Each magnet 230 is captivated between a rung pair 215, 235 and an adjacent rung pair 215, 235 as illustrated. The rungs are formed inwardly to capture the magnet. A punching or stamping process may be used to form the rungs.

A cross-sectional view of moving element 200 along section line C—C of FIG. 10A is shown in FIG. 10C. FIG. 10C shows moving element 200 to include side rails 65 and 70, described in detail previously. Side rails 65 and 70 and their respective mounting plates 68 and 72 are mounted to upper and lower ladder structures 205 and 210, respectively, using spot welds or rivets through the ladder structures and mounting plates 68 and 72.

FIG. 10D ilustrates a modification of ladder structures 205 and 210 in which support members 220 and 225 are wider and are deformed to create outwardly extending flanges 240. The flanges 240 of opposed structures 205, 210 are dimensioned to abut one another when the structures are brought together with the magnets sandwiched therebetween. The flanges 240 can then be spot-welded to complete the moving element. The abutting and weld flanges 240 form rails equivalent to rails 65 and 70 of FIGS. 10A and 10C. This arrangement eliminates the need for separate rail mounting plates 68 and 72 shown in FIG. 10C.

Figures 11, 13:
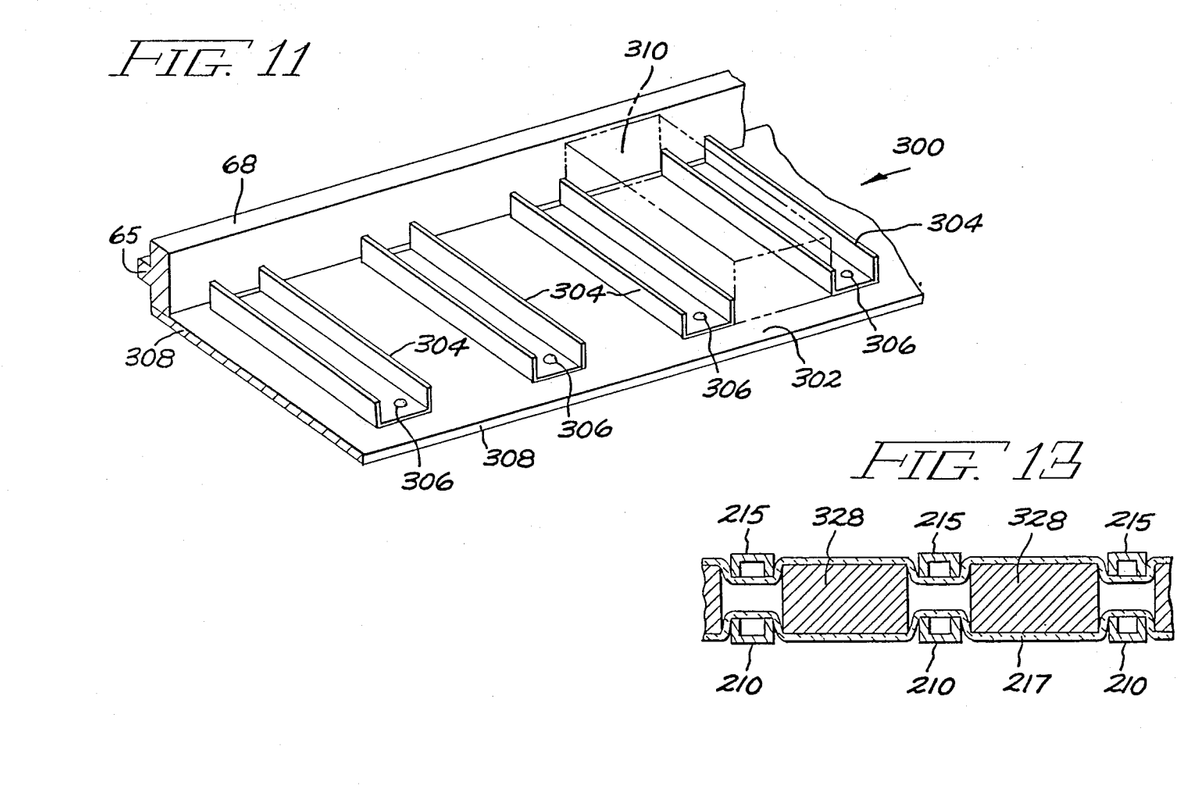
FIG. 11 is a perspective view of a portion of a moving element with another magnet mounting arrangement wherein magnets are surface mounted on the moving element.
FIG. 13 is a cross-sectional, partial view of another form of moving element construction in a surface mounted magnet arrangement.

FIG. 11 illustrates an alternative embodiment of the moving element for an electromagnetic actuator, again using surface mounted magnets. The moving element, indicated generally at 300, includes a strip or flat plate 302 of a non-magnetic material (plastic, brass, austenitic steel or aluminum, for example) upon which a plurality of spaced non-magnetic U-shaped channels 304 are mounted by means of spot welds or rivets 306. Along each edge 308 of strip 302 there is provided sufficient space, beyond the end of the U-shaped channels 304, to attach mounting plates 68 and 72 which support the respective side rails 65 and 70. (While only plate 68 is shown positioned on the far side of strip 302 for clarity of illustration, it will be appreciated that the other of the plates 68 and 72 is to be positioned along the near side of strip 302.) One of the surface mounted magnets 310 is indicated in phantom. The magnets are positioned between adjustment ones of channels 304 in alternating north-south alignment as previously described. A second strip 302 (not shown) with channels 304 is placed atop the assembly illustrated in FIG. 11 in mirror-image fashion so as to capture the magnets 310 and complete the construction of moving element 300. Strips 302 are attached to side plate 68 and side plate 72 (not shown) by rivets or other means to form an integral assembly. Plates 68 and 72 provide sufficient rigidity for this embodiment.

Figure 12:
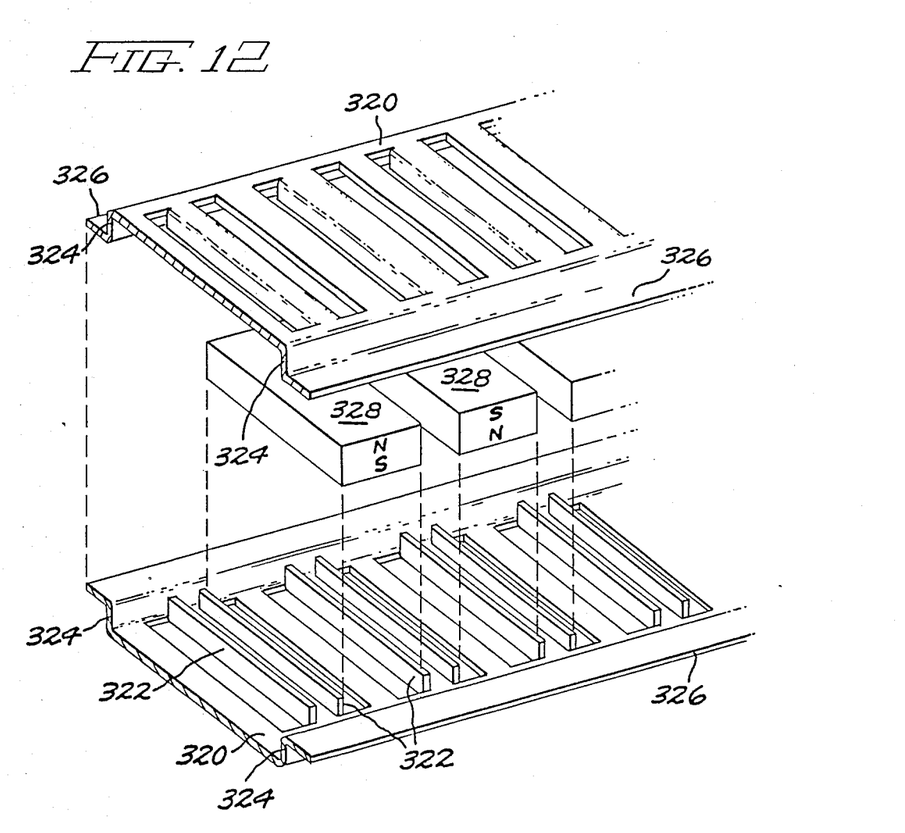
FIG. 12 is an exploded perspective view of a portion of a moving element with surface mounted magnets, showing an alternative magnet mounting arrangement.

Still another embodiment of the surface mounted magnet configuration is illustrated in FIG. 12. In this embodiment, upper and lower support plates 320 are stamped or punched from non-magnetic sheet material. In the stamping operation, taps 322 are cut along three sides and bent at 90 degrees to form their upstanding shape. It will be noted that their shape and position correspond to the shape and position of U-shaped channels 304 of FIG. 11, the difference being that taps 322 are formed integrally with plates 320. Additionally, the edges 324 of plates 320 are deformed from the plane of plates 320 to create outwardly extending flanges 326. As in the embodiment of FIG. 12, two of plates 320, arranged in mirror-image relationship, are welded to capture a plurality of magnets 328 therebetween. When so arranged, flanges 326 of opposed plates 320 abut each other to create integral rails equivalent to rails 65 and 70 of previously-described embodiments. Flanges 326 may be joined by use of spaced rivets or by spot welding. Since flanges 326 are to be used as sliding rails, it is preferable to use spot welding rather than rivets which could require countersinking and grinding to form a smooth surface.

FIG. 13 illustrates a modification of the embodiment of FIGS. 10A-10C in which the need for specially shaped magnets and canted flanges on rungs 210 and 215, as shown in FIG. 10B, is obviated. In this configuration, rungs 210 and 215 are spaced slightly farther apart so that a glass cloth 217 or other suitable material can be woven under the rungs and over the magnets to capture the magnets within the assembly. The assembly may then be encapsulated using an epoxy resin.

While in the above example of the linear electromagnetic actuator, the stator and moving elements have been referred to as exhibiting a generally linear geometry, it will be appreciated that the stator and moving elements can be fabricated using a generally circular geometry as well. More particularly, the magnetic structure of the moving element can be made circular so as to form a magnetic rotor structure for a permanent magnet motor.

The foregoing describes an electromagnetic motor-actuator apparatus which propels a moving element with relatively high force levels with respect to the volume occupied by such motor-actuator. The motor-actuator desirably maximizes the force which can be obtained from the magnetic flux and electric current provided thereto.

While only certain preferred features of the invention have been shown by way of illustration, many modifications and changes will occur to those skilled in the art. For example, bearings can be used at the location of the side rails to further reduce the sliding friction of the moving element. It is to be understood that the present claims are intended to cover all such modifications and changes which fall within the true spirit of the invention.

What I claim is:

1. An electromagnetic machine comprising:
   a stationary member having a plurality of slots for receiving multiple electrical windings for generating controllable electromagnetic poles along a surface of said stationary member upon energization of said windings with controlled electric current;
   a movable member of magnetic material positioned adjacent said surface of said stationary member, said movable member having a pluraltiy of slots angularly oriented with respect to said surface; and
   a plurality of magnets, each of said magnets being dimensioned to snugly fit within a corresponding one of said plurality of slots, respectively, said magnets being oriented such that facing poles of said magnets are of the same polarity so as to concentrate magnetic flux between said magnets to generate a sequence of alternating magnetic poles along a surface of said movable member adjacent said surface of said stationary member.

2. The electromagnetic machine of claim 1 including a second stationary member having a plurality of slots for receiving multiple electrical windings for generating controllable electromagnetic poles along a second surface of said stationary member upon energization of said windings with controlled electrical current, said second stationary member being positioned along a surface of said movable member at a location opposite said surface of said firstnamed stationary member.

3. The electromagnetic machine of claim 2 wherein said magnets are oriented at an angle of about 45 degrees.

4. The electromagnetic machine of claim 3 wherein said movable member comprises:
   a plurality of stacked laminations, each of said laminations being formed with a plurality of spaced, parallel, rectangular apertures, said laminations being stacked with corresponding one of said apertures aligned for forming said slots extending from top to bottom of said stack; and
   guide rails attached to said top and said bottom of said stack.

5. The electromagnetic machine of claim 4 including rivets extending through said guide rails and said stack.

6. The electromagnetic machine of claim 4 wherein said surfaces of said stack are machined off to a sufficient depth to expose said magnets.

7. An electromagnetic machine comprising:
   a stationary member having a plurality of slots for receiving multiple electrical windings for generating controllable electromagnetic poles along a surface of said stationary member upon energization of said windings with controlled electric current;
   a movable member having an upper and a lower support structure, each of said support structures including a plurality of spaced, parallel positioning means defining a plurality of spaced slots, said upper and lower support structures being oriented such that corresponding ones of said positioning means are aligned;
   a plurality of magnets, each of said magnets being positioned within a corresponding one of said slots, respectively, said magnets being arranged such that magnetic poles at each of said upper and lower support structures occur in alternating north-south polarity from a first end to a second end of said movable member; and
   a side rail coupled to each side of said movable member, respectively, for supporting said movable member in sliding relationship to said stationary member.

8. The electromagnetic machine of claim 7 wherein each of said support structures comprises a planar portion of non-magnetic material having a pluraliy of punched openings with two opposed tabs extending from each of said openings, respectively, said tabs being deformed out of said planar portion of non-magnetic material for establishing positioning means for said magnets.

9. The electromagnetic machine of claim 8 wherein each of said openings, respectively, has a dimension in the end-to-end direction of said movable member which is less than a corresponding dimension of each of said magnets, respectively, said tabs being canted away from their respective openings for sliding over edges of corresponding ones of said magnets and snugly restraining said magnets.

10. The electromagnetic machine of claim 8 including a glass cloth threaded under each of said positioning means and over each of said magnets on each of said upper and lower support structures, respectively, for restraining said magnets within said support structures, and an epoxy resin encapsulating said assembled support members, said magnets and said glass cloth into a composite assembly.

11. The electromagnetic machine of claim 8 wherein edges of said non-magnetic material extending from end-to-end thereof in the direction of each said side rail are deformed out of the planar portion of said sheet so as to form outwardly extending flanges, the flanges of said upper and lower support structures being oriented to abut one another and thereby constitute said side rails.

12. The electromagnetic machine of claim 7 wherein said support structure comprises a planar portion of non-magnetic material and said positioning means comprises U-shaped channels attached to a surface of said planar sheet.

13. The electromagnetic machine of claim 12 wherein edges of said non-magnetic material extending from end-to-end thereof in the direction of each said side rail are deformed out of the planar portion of said sheet so as to form outwardly extending flanges, the flanges of said upper and lower support structures being oriented to abut one another and thereby constitute said side rails.

* * * * *